United States Patent
Endo

(10) Patent No.: US 9,454,984 B2
(45) Date of Patent: Sep. 27, 2016

(54) INFORMATION RECORDING MEDIUM GLASS SUBSTRATE AND INFORMATION RECORDING MEDIUM

(75) Inventor: Takeshi Endo, Osakasayama (JP)

(73) Assignee: HOYA CORPORATION, Tokyo (JP)

( * ) Notice: Subject to any disclaimer, the term of this patent is extended or adjusted under 35 U.S.C. 154(b) by 83 days.

(21) Appl. No.: 14/347,944

(22) PCT Filed: Sep. 11, 2012

(86) PCT No.: PCT/JP2012/073192
§ 371 (c)(1),
(2), (4) Date: Mar. 27, 2014

(87) PCT Pub. No.: WO2013/047189
PCT Pub. Date: Apr. 4, 2013

(65) Prior Publication Data
US 2014/0227561 A1    Aug. 14, 2014

(30) Foreign Application Priority Data

Sep. 30, 2011 (JP) ................................. 2011-217374

(51) Int. Cl.
*G11B 5/73* (2006.01)

(52) U.S. Cl.
CPC .................................. *G11B 5/7315* (2013.01)

(58) Field of Classification Search
None
See application file for complete search history.

(56) References Cited

U.S. PATENT DOCUMENTS

| 7,618,723 | B2* | 11/2009 | Usui ..................... B24B 37/042 428/846.9 |
| 8,092,280 | B2 | 1/2012 | Ishida et al. |
| 8,241,768 | B2* | 8/2012 | Takizawa ................. G11B 5/82 360/135 |
| 2007/0048553 | A1* | 3/2007 | Nakano ................. G11B 5/7315 428/846.2 |
| 2007/0269684 | A1 | 11/2007 | Machida et al. |
| 2008/0020679 | A1 | 1/2008 | Usui et al. |
| 2009/0136786 | A1 | 5/2009 | Aida et al. |
| 2009/0158775 | A1 | 6/2009 | Takizawa |
| 2010/0040907 | A1* | 2/2010 | Takizawa ................. G11B 5/82 428/826 |
| 2010/0136372 | A1 | 6/2010 | Ishida et al. |
| 2010/0247977 | A1* | 9/2010 | Tsuchiya ............. G11B 5/8404 428/846.9 |
| 2012/0251760 | A1 | 10/2012 | Ishida et al. |
| 2015/0340054 | A1* | 11/2015 | Takizawa ................. G11B 5/82 428/848.6 |

FOREIGN PATENT DOCUMENTS

| CN | 101010736 A | 8/2007 |
| CN | 101108467 A | 1/2008 |
| CN | 101268508 A | 9/2008 |
| CN | 101745852 A | 6/2010 |
| JP | 2006-198751 A | 8/2006 |
| JP | 2006-198751 A | 8/2006 |

(Continued)

OTHER PUBLICATIONS

Office Action and translation for corresponding Japanese Application No. 2013-536144 dated Sep. 24, 2014 (6 pages).

(Continued)

*Primary Examiner* — Kevin Bernatz
(74) *Attorney, Agent, or Firm* — Brinks Gilson & Lione

(57) ABSTRACT

An information recording medium glass substrate and an information recording medium are provided in which a first roll-off variation and a second roll-off variation fall within the following ranges: 180 Å≤first roll-off variation≤990 Å (condition 1) and 650 Å≤second roll-off variation≤3700 Å (condition 2).

7 Claims, 4 Drawing Sheets

(56) References Cited

FOREIGN PATENT DOCUMENTS

| | | |
|---|---|---|
| JP | 2006-228284 A | 8/2006 |
| JP | 2006-228284 A | 8/2006 |
| JP | 2007-257811 A | 10/2007 |
| JP | 2008-103061 A | 5/2008 |
| JP | 2008-103061 A | 5/2008 |
| JP | 2011-000704 A | 1/2011 |
| WO | WO 2008/102751 A1 | 8/2008 |

OTHER PUBLICATIONS

Written Opinion for corresponding Singapore Application No. 11201401063Y dated Oct. 21, 2014 (5 pages).

International Search Report in International Application No. PCT/JP2012/073192, dated Dec. 25, 2012, 1 page.

Office Action issued in corresponding Chinese Application No. 201280048022.4 Apr. 5, 2016 (with English translation, 8 pages).

* cited by examiner

FIG.6

| | RO1 (Å) | RO2 (Å) | RO3 (Å) | S1 (RO1−RO2) | S2 (RO2−RO3) | LU | GA 1 1.3 mm FROM OUTER PERIPHERAL END SURFACE | GA 2 1.1 mm FROM OUTER PERIPHERAL END SURFACE | GA 3 0.9 mm FROM OUTER PERIPHERAL END SURFACE | NOTES |
|---|---|---|---|---|---|---|---|---|---|---|
| EXAMPLE 1 | −120 | −370 | −1320 | 250 | 950 | PASS | A | A | A | GOOD |
| EXAMPLE 2 | −220 | −670 | −2540 | 450 | 1870 | PASS | A | A | A | GOOD |
| EXAMPLE 3 | −10 | −290 | −2770 | 280 | 2480 | PASS | A | A | C | ROLL-OFF: INTERMEDIATE |
| EXAMPLE 4 | −80 | −260 | −1070 | 180 | 810 | PASS | A | B | C | |
| EXAMPLE 5 | −650 | −860 | −1510 | 210 | 650 | PASS | A | C | C | |
| EXAMPLE 6 | −620 | −1610 | −5310 | 990 | 3700 | PASS | A | C | C | ROLL-OFF: LARGE |
| COMPARATIVE EXAMPLE 1 | +100 | −70 | −2480 | 170 | 2410 | FAIL | − | − | − | | ated application of International Application No. PCT/JP2012/073192, filed Sep. 11, 2012.
INFORMATION RECORDING MEDIUM GLASS SUBSTRATE AND INFORMATION RECORDING MEDIUM

BACKGROUND

This application is a National Stage application of International Application No. PCT/JP2012/073192, filed Sep. 11, 2012.

1. Technical Field Text

The present invention relates to an information recording medium glass substrate and an information recording medium.

2. Background Art

An information recording device such as an HDD (Hard Disk Drive) contains a disk-shaped information recording medium such as a magnetic disk or an opto-magnetic disk. A disk-shaped information recording medium glass substrate is used for the information recording medium. A magnetic thin film layer including a recording layer having magnetic, optical, or opto-magnetic properties is formed on a main surface of the information recording medium glass substrate. The magnetic thin film layer is magnetized by a magnetic head whereby prescribed information is recorded in the information recording medium.

The information recording medium rotates at high speed in the inside of the information recording device such as an HDD. To record and reproduce information into/from the information recording medium, the magnetic head flies over the magnetic thin film layer formed on the main surface of the information recording medium glass substrate. A DFH (Dynamic Flying Height) mechanism is employed in information recording devices in order to increase the recording density.

The distance (hereinafter referred to as "floating height") between the magnetic head and the outermost surface (the surface of the magnetic thin film layer) of the information recording medium has been over 10 nm. Letting the radius length from the center of the information recording medium to the outer edge in the radial direction be 100%, even when the head travel region is extended to a region over 97% from the center, there has been no problem in write and read of information into/from the information recording medium by the magnetic head.

With the recent increasing recording density, there has been a tendency for the floating height to be smaller. Reducing the floating height can improve the S/N ratio of a received signal at the magnetic head and increase the recording density in the information recording medium.

With the floating height of 5 nm or less, demand for smoothness and flatness of the main surface of the information recording medium glass substrate is increasing in order to prevent the contact between the outermost surface of the information recording medium and the magnetic head (this phenomenon is called a head crash). When entering the recording surface of the information recording medium from the retracted position, the magnetic head is likely to be affected by air flow disturbance resulting from the shape of the outer peripheral end surface of the information recording medium, possibly leading to unstable floating of the magnetic head (glide avalanche).

The unstable floating of the magnetic head during transition from the retracted position to the travel position on the recording surface of the information recording medium has adverse effects on the floating of the magnetic head during travel on the recording surface. Consequently, the recording density on the information recording medium cannot be increased efficiently.

Japanese Laid-Open Patent Publication Nos. 2011-000704 (Patent Document 1) and 2007-257811 (Patent Document 2) describe that flatness in the neighborhood of the outer edge of an information recording medium is also required in the same manner as the flatness of the surface of the information recording medium in order to increase the amount of information that can be stored in a single information recording medium.

CITATION LIST

Patent Document

PTD 1: Japanese Laid-Open Patent Publication No. 2011-000704

PTD 2: Japanese Laid-Open Patent Publication No. 2007-257811

BRIEF SUMMARY

Technical Problem

The problem to be solved by the invention lies in that the magnetic head is likely to be affected by air flow disturbance resulting from the shape of the outer peripheral end surface neighboring region of the information recording medium when entering the recording surface of the information recording medium from the retracted position, thereby leading to unstable floating of the magnetic head.

The present invention is made in view of the foregoing situation and aims to provide an information recording medium glass substrate and an information recording medium having a structure in which air flow disturbance resulting from the shape of the outer peripheral end surface neighboring region of the information recording medium is unlikely to occur when the magnetic head enters the recording surface of the information recording medium from the retracted position.

Solution to Problem

An information recording medium glass substrate according to the present invention is shaped like a disk having a rotation center and is for use in an information recording medium of an information storage device. The information recording medium glass substrate includes a main surface having the magnetic thin film layer formed thereon and an outer peripheral end surface located at an edge of the information recording medium glass substrate.

In a distance in a radial direction from the outer peripheral end surface of the main surface toward the rotation center, when an extension of a line between a point where the distance in the radial direction from the outer peripheral end surface on the main surface is 1.2 mm and a point where the distance in the radial direction from the outer peripheral end surface is 0.75 mm is a reference position, and an amount of deviation of any selected position on the main surface from the reference position in a direction in which an axis of rotation passing through the rotation center is a roll-off value, the roll-off value at a first radial position where the distance in the radial direction from the outer peripheral end surface is 0.55 mm is a first roll-off value, the roll-off value at a second radial position where the distance in the radial direction from the outer peripheral end surface is 0.45 mm is a second roll-off value, the roll-off value at a third radial position where the distance in the radial direction from the outer peripheral end surface is 0.30 mm is a third roll-off value, a difference between the first roll-off value and the second roll-off value is a first roll-off variation, and a difference between the second roll-off value and the third roll-off value is a second roll-off variation, the first roll-off variation and the second roll-off variation satisfy the following conditions 1 and 2:

$$180 \text{ Å} \leq \text{first roll-off variation} \leq 990 \text{ Å} \quad \text{condition 1}$$

$$650 \text{ Å} \leq \text{second roll-off variation} \leq 3700 \text{ Å} \quad \text{condition 2.}$$

In another fashion, the condition 1 is 180 Å≤first roll-off variation≤450 Å, and the condition 2 is 810 Å≤second roll-off variation≤2480 Å.

In another fashion, the condition 1 is 250 Å≤first roll-off variation≤450 Å, and the condition 2 is 950 Å≤second roll-off variation≤1870 Å.

In another fashion, the information recording medium glass substrate has an inclined surface having a width of 0.1 mm in the radial direction from the outer peripheral end surface, in a region in which the main surface and the outer peripheral end surface intersect.

In another fashion, the distance in the radial direction from the outer peripheral end surface to the axis of rotation is 32.5 mm.

An information recording medium according to the present invention is for use in an information storage device and includes the information recording medium glass substrate as described above and a magnetic thin film layer provided on a main surface of the information recording medium glass substrate.

In another fashion, a recording density on a single side of the main surface is 500 Gbit/inch2 or more.

Advantageous Effects of Invention

The present invention can provide an information recording medium glass substrate and an information recording medium having a structure in which air flow disturbance resulting from the shape of the outer peripheral end surface neighboring region of the information recording medium is unlikely to occur when the magnetic head enters the recording surface of the information recording medium from the retracted position.

BRIEF DESCRIPTION OF THE DRAWINGS

FIG. 6 is a table showing a first roll-off value (RO1), a second roll-off value (RO2), a third roll-off value (RO3), a first roll-off variation (S1), a second roll-off variation (S2), the presence/absence of head crash (LU), a floating test evaluation (GA1) at a position 1.3 mm from the outer peripheral end surface, a floating test evaluation (GA2) at a position 1.1 mm from the outer peripheral end surface, and a floating test evaluation (GA3) at a position 0.9 mm from the outer peripheral end surface in each of Examples 1 to 6 and Comparative Example 1.

DETAILED DESCRIPTION OF THE DRAWINGS AND THE PRESENTLY PREFERRED EMBODIMENTS

Figure 1:
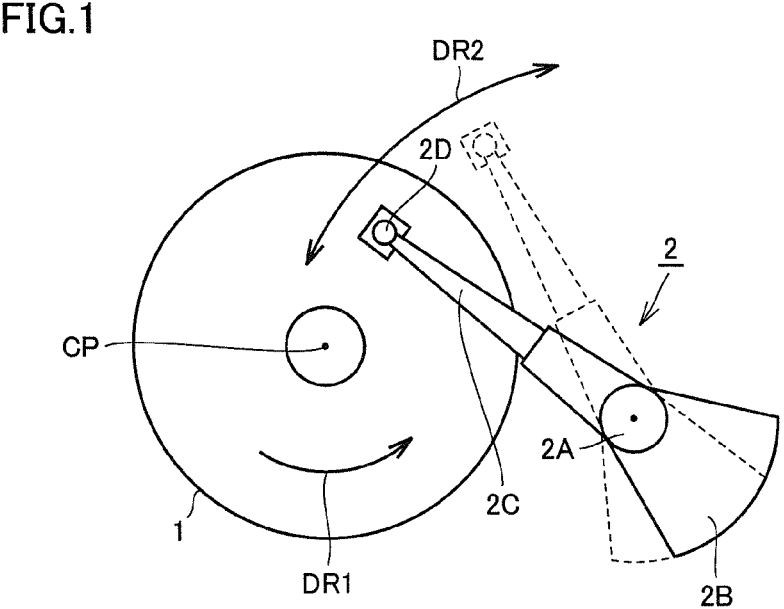
FIG. 1 is a diagram schematically showing a configuration of an information recording device in an embodiment.

Embodiments and examples based on the present invention will be described below with reference to the drawings. The scope of the present invention is not limited to the number and quantity referred to in the description of the embodiments and examples, if any, unless otherwise specified. In the description of the embodiments and examples, the same and corresponding parts are denoted with the same reference numerals, and an overlapping description may not be repeated.

(Schematic Configuration of Information Recording Device 2)

Referring to FIG. 1, an example of the schematic configuration of an information recording device 2 will be described. FIG. 1 is a diagram schematically showing a configuration of information recording device 2 in an embodiment.

As shown in FIG. 1, information recording device 2 has a magnetic head 2D arranged so as to be opposed to an information recording medium 1 rotatably driven in the direction of arrow DR1. The shape of information recording medium 1 will be described later with reference to FIG. 2 and FIG. 3. Information recording medium 1 rotates at high speed about a rotation center CP.

Magnetic head 2D is mounted on a tip end of a suspension 2C. Suspension 2C is provided pivotably about a support shaft 2A in the direction of arrow DR2 (tracking direction). A tracking actuator 2B is attached to support shaft 2A.

Magnetic head 2D moves between a retracted position out of information recording medium 1 and a tracking (recording surface) position where it floats over information recording medium 1.

(Configuration of Information Recording Medium 1)

Figure 2:
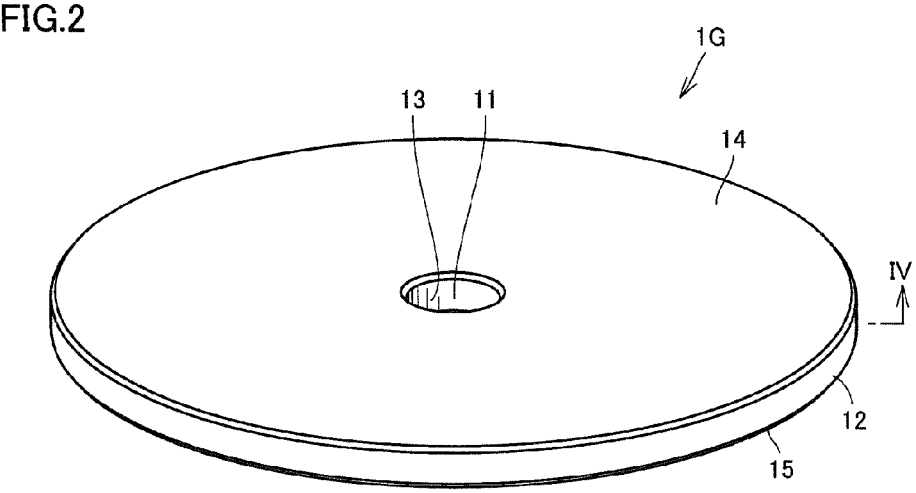
FIG. 2 is a perspective view of an information recording medium glass substrate in the embodiment.
Figure 3:
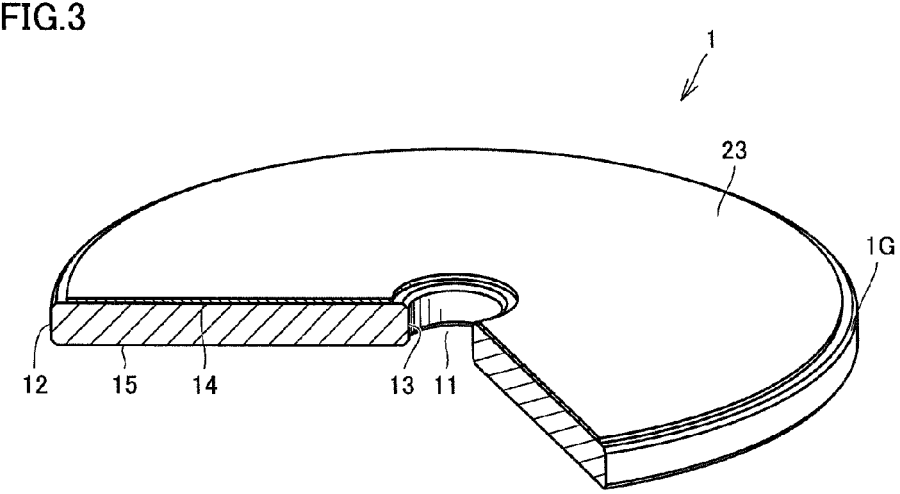
FIG. 3 is a perspective view of an information recording medium in the embodiment.

Referring to FIG. 2 and FIG. 3, a configuration of an information recording medium glass substrate 1G and information recording medium 1 will be described. FIG. 2 is a perspective view of information recording medium glass substrate 1G, and FIG. 3 is a perspective view of information recording medium 1.

As shown in FIG. 2, information recording medium glass substrate 1G for use in information recording medium 1 (hereinafter referred to as "glass substrate 1G") has the shape of an annular disk having a hole 11 at the center. Glass substrate 1G has an outer peripheral end surface 12, an inner peripheral end surface 13, a front main surface 14, and a back main surface 15. Amorphous glass is used as glass substrate 1G with an outer diameter of about 65 mm, an inner diameter of about 20 mm, and a thickness of about 0.8 mm.

As shown in FIG. 3, information recording medium 1 has a magnetic thin film layer 23 on front main surface 14 of glass substrate 1G described above. Although magnetic thin film layer 23 is formed only on front main surface 14 in the figure, magnetic thin film layer 23 may be provided on back main surface 15.

Conventionally known methods can be used as a method for forming magnetic thin film layer 23. Examples of the method include forming a thermosetting resin including magnetic particles dispersed therein on a substrate by spin coating, forming by sputtering, and forming by electroless plating.

The film thickness by spin coating is about 0.3 to 1.2 μm, the film thickness by sputtering is about 0.04 to 0.08 μm, and the film thickness by electroless plating is about 0.05 to 0.1 μm. The film is preferably formed by sputtering or by electroless plating in view of reducing the thickness and increasing the density.

The magnetic material for use in magnetic thin film layer 23 may be those conventionally known, although not limited thereto. Preferable examples include Co alloys, which are based on Co having high crystal anisotropy for obtaining a high coercive force and include addition of Ni, Cr for the purpose of adjusting residual magnetic flux density. FePt-based materials have recently been used as a preferable magnetic layer material for heat-assisted recording.

A thin coating of a lubricant may be applied on the surface of magnetic thin film layer 23 in order to improve sliding of the magnetic head. Examples of the lubricant include perfluoropolyether (PFPE) which is a liquid lubricant diluted with a Freon-based solvent or other solvents.

An underlayer and a protective layer may be provided as necessary. The underlayer in information recording medium 1 is selected depending on the magnetic film. Examples of the material of the underlayer include at least one selected from non-magnetic metals such as Cr, Mo, Ta, Ti, W, V, B, Al, and Ni.

The underlayer may not be a single layer but may be of a multilayer structure in which the same or different kinds of layers are stacked. For example, a multilayered underlayer such as Cr/Cr, Cr/CrMo, Cr/CrV, NiAl/Cr, NiAl/CrMo, and NiAl/CrV can be used.

Examples of the protective layer for preventing wear and corrosion of magnetic thin film layer 23 include a Cr layer, a Cr alloy layer, a carbon layer, a hydrogenated carbon layer, a zirconia layer, and a silica layer. The protective layer can be formed successively together with the underlayer, the magnetic film, or other layers by an in-line sputtering system. The protective layer may be a single layer or may be of a multilayer structure including the same or different kinds of layers.

Another protective layer may be formed on the above-noted protective layer or in place of the above-noted protective layer. For example, a silicon oxide (SiO2) layer may be formed in place of the above-noted protective layer by applying colloidal silica fine particles dispersed in tetraalkoxysilane diluted with an alcohol-based solvent on the Cr layer, followed by baking.

Figure 4:
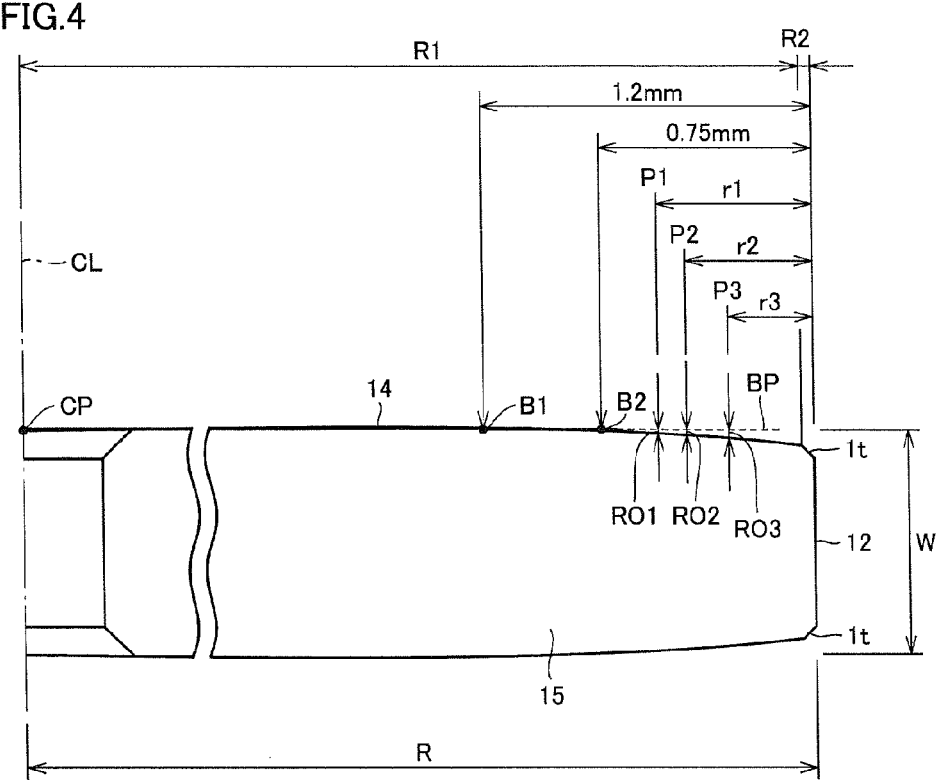
FIG. 4 shows a partially enlarged cross-section as viewed from the arrow IV in FIG. 2.

Referring to FIG. 4, the shape of glass substrate 1G on the outer peripheral end surface 12 side and a roll-off value RO will be described. The roll-off value RO means the amount of deviation of any selected main surface position from a reference position BP in the direction in which the axis of rotation CL passing through rotation center CP extends, where the reference position BP is an extension of the line between points B1 and B2, where B1 is the point where the distance in the radial direction from outer peripheral end surface 12 on front main surface 14 is 1.2 mm, and B2 is the point where the distance in the radial direction from outer peripheral end surface 12 is 0.75 mm. A negative roll-off value means that the selected main surface position deviates from the reference position BP in a direction towards the opposite main surface. The measurement on back main surface 15 is the same as in front main surface 14.

Glass substrate 1G in the present embodiment has a disk-like shape with a radius (R) of about 32.5 mm and a thickness (W) of about 0.8 mm. An inclined surface 1t having a width (R2) of 0.1 mm in the radial direction from outer peripheral end surface 12 is provided on the outer peripheral end surface 12 side in a region where main front surface 14 and outer peripheral end surface 12 intersect. A similar inclined surface 1t is provided also in a region where back main surface 15 and outer peripheral end surface 12 intersect. In the figure, R1 is about 32.4 mm.

The roll-off value RO is mainly formed in a polishing step in the manufacturing process of glass substrate 1G. If the roll-off value RO is too large, magnetic head 2D causes air flow disturbance when entering the tracking (recording surface) position of the information recording medium from the retracted position, thereby leading to unstable floating of magnetic head 2D (glide avalanche).

In the present embodiment, therefore, a floating test of magnetic head 2D was performed in connection with the relationship between the roll-off value RO and occurrence of air flow disturbance. The results of the floating test are shown as Examples below.

EXAMPLES

A glass substrate having the size described above was used as glass substrate 1G. In the polishing step, with a batch of 100 substrates as a unit, 10 batches were processed with a double-side polisher and sorted by shapes to obtain seven kinds of substrates (Example 1, Example 2, Comparative Examples 1 to 5).

Information recording medium 1 was obtained by forming magnetic thin film layer 23 on main surface 14 of glass substrate 1G. The roll-off values RO were measured (shape evaluation) using OSA6300 manufactured by KLA-Tencor Corporation. The recording mode used was vertical magnetic recording, and information recording device 2 having the DFH mechanism as shown in FIG. 1 was used.

The rotation speed of information recording medium 1 in information recording device 2 was 7200 rpm. The roll-off values RO of each information recording medium 1 were measured. Specifically, the roll-off values RO were measured at a first radial position P1 where the distance r1 in the radial direction from outer peripheral end surface 12 was 0.55 mm (the distance from rotation center CP was 31.95 mm), a second radial position P2 where the distance r2 in the radial direction from outer peripheral end surface 12 was 0.45 mm (the distance from rotation center CP was 32.05 mm), and a third radial position P3 where the distance r3 in the radial direction from outer peripheral end surface 12 was 0.30 mm (the distance from rotation center CP was 32.20 mm).

The roll-off value RO at the first radial position P1 was set as a first roll-off value RO1. The roll-off value RO at the second radial position P2 was set as a second roll-off value RO2. The roll-off value RO at the third radial position P3 was set as a third roll-off value RO3. A positive roll-off value means that the main surface is located closer to magnetic head 2D with respect to the reference position BP that is an extension of the line between the point located 1.2 mm from outer peripheral end surface 12 and the point located 0.75 mm from outer peripheral end surface 12 on front main surface 14.

Figure 5:
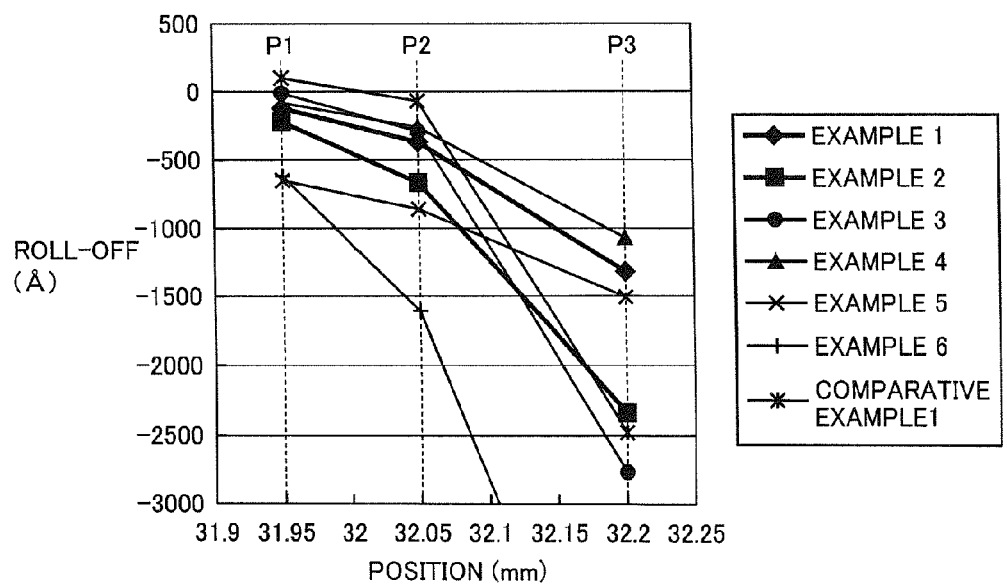
FIG. 5 is a graph showing the measured values of a first roll-off value RO1 at a first radial position P1, a second roll-off value RO2 at a second radial position P2, and a third roll-off value RO3 at a third radial position P3 in each information recording medium of Examples 1 to 6 and Comparative Example 1.

FIG. 5 is a graph showing the measured values of the first roll-off value RO1 at the first radial position P1, the second roll-off value RO2 at the second radial position P2, and the third roll-off value RO3 at the third radial position P3 of each information recording medium 1 in Examples 1 to 6 and Comparative Example 1. The numeric data of measurement is shown in FIG. 6.

Roll-off values were measured in orthogonal four directions passing through rotation center CP in the distance in the radial direction from the outer peripheral end surface of the main surface toward rotation center CP of information recording medium 1 under test. The mean value of the four roll-off values RO was set as a roll-off value RO in that distance in the radial direction.

Load/unload (LU) test was performed on each information recording medium 1 prior to the floating test. Load/unload was repeated 1000 times, and the read outputs in the first and 1000th head load were compared. When the output decreased by 20% or more, it was assumed that the head crashed (was damaged). Whether a head crash occurred was thus determined.

With magnetic head 2D traveling, the floating test of magnetic head 2D was performed twice at three distance positions in the radial direction each. The floating test was performed at a first test position GA1 where the distance in the radial direction from outer peripheral end surface 12 was 1.3 mm (the distance from rotation center CP was 31.2 mm), a second test position GA2 where the distance in the radial direction from outer peripheral end surface 12 was 1.1 mm (the distance from rotation center CP was 31.4 mm), and a third radial position GA3 where the distance in the radial direction from outer peripheral end surface 12 was 0.9 mm (the distance from rotation center CP was 31.6 mm). The results are shown in FIG. 6. In the floating test, the floating height from the outermost surface of magnetic thin film layer 23 of magnetic head 2D was 5 nm. In the floating test, the test was performed using a glide test head with a picoslider in RQ7800 evaluation system manufactured by Hitachi High-Technologies Corporation.

Passing in the floating test means that magnetic head 2D passed through without colliding with or touching projections on the magnetic disk surface without causing air flow disturbance on the first to third radial positions.

In FIG. 6, "A" means passing in the floating test twice, "B" means passing once and failing once in the floating test performed twice, "C" means failing twice in the floating test, and "−" means that the floating test was not conducted.

As can be understood from the table in FIG. 6, the glass substrates used in Examples 1 and 2 passed in the load/unload test (LU) and were evaluated as "A" at all the test positions GA1, GA2, and GA3 in the floating test.

Information recording medium 1 used in Example 3 passed in the load/unload test (LU) and was evaluated as "A" at two positions GA1 and GA2 but evaluated as "C" at GA3 in the floating test.

Information recording medium 1 used in Example 4 passed in the load/unload test (LU) and was evaluated as "A" at GA1, as "B" at GA2, and as "C" at GA3.

Information recording medium 1 used in Example 5 passed in the load/unload test (LU) and was evaluated as "A" at GA1 and as "C" at GA2 and GA3.

Information recording medium 1 used in Example 6 passed in the load/unload test (LU) and was evaluated as "A" at GA1 and as "C" at GA2 and GA3.

Information recording medium 1 used in Comparative Example 1 failed in the load/unload test (LU) and therefore did not undergo the floating test.

Referring to FIG. 6, the relationship between the evaluation results above and the roll-off values of information recording media 1 of Examples 1 to 6 and Comparative Example 1 will be examined. The difference between the first roll-off value RO1 and the second roll-off value RO2 (RO1-RO2) is set as a first roll-off variation S1, and the difference between the second roll-off value RO2 and the third roll-off value RO3 (RO2-RO3) is set as a second roll-off variation (S2).

The evaluation results of Example 1 and Example 2 indicate that the most preferable range of the first roll-off variation S1 is 250 Å≤S1≤450 Å and the most preferable range of the second roll-off variation S2 is 950 Å≤S2≤1870 Å.

Excluding the evaluation at GA3 farthest from rotation center CP, the evaluation results from Example 1 to Example 4 indicate that the preferable range of the first roll-off variation S1 is 180 Å≤S1≤450 Å and the preferable range of the second roll-off variation S2 is 810 Å≤S2≤2480 Å.

Excluding the evaluations at GA2, GA3 from rotation center CP, the evaluation results from Example 1 to Example 6 indicate that the preferable range of the first roll-off variation S1 is 180 Å≤S1≤450 Å and the preferable range of the second roll-off variation S2 is 810 Å≤S2≤2480 Å.

In the description of Examples above, information recording medium 1 having magnetic thin film layer 23 formed on glass substrate 1G was evaluated. Since the film thickness of magnetic thin film layer 23 is small relative to the thickness of glass substrate 1G, the measurement information of the roll-off value RO and evaluation obtained from each information recording medium 1 can be equated with the measurement information of the roll-off value RO and evaluation of glass substrate 1G.

Although information recording medium 1 having a diameter of 65 mm (2.5 inches) has been described above, different sizes (1.8 inches, 3.5 inches, 5.25 inches) can also achieve the same effects.

In the glass substrate and the information recording medium in the present embodiment described above, the shape of the outer peripheral end surface neighboring region of the information recording medium is optimized while focusing on the roll-off values RO and the roll-off variations, thereby suppressing air flow disturbance resulting from the shape of the outer peripheral end surface neighboring region of the information recording medium when the magnetic head enters the recording surface of the information recording medium from the retracted position.

Accordingly, in the information recording device with the DFH mechanism in which the floating amount of the magnetic head is 5 nm or less, information can be stably written and read by the magnetic head into/from a high-density information recording medium with a recording density on a single side as high as 500 Gbit/inch2 or more.

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST 1 information recording medium, 1G information recording medium glass substrate, 1t inclined surface, 2 information recording device, 2A support shaft, 2B tracking actuator, 2C suspension, 2D magnetic head, 11 hole, 12 outer peripheral end surface, 13 inner peripheral end surface, 14 front main surface, 15 back main surface, 23 magnetic thin film layer.

The invention claimed is:

1. A disk-shaped information recording medium glass substrate having a rotation center for use in an information recording medium of an information storage device, comprising:
   a first main surface;
   a second main surface opposite the first main surface; and
   an outer peripheral end surface located at an edge of said information recording medium glass substrate wherein
   in a distance in a radial direction from said outer peripheral end surface of said first main surface toward said rotation center, when
   an extension of a line between a point where said distance in the radial direction from said outer peripheral end surface on said first main surface is 1.2 mm and a point where said distance in the radial direction from said outer peripheral end surface is 0.75 mm is a reference position, and an amount of deviation of any selected position on said first main surface from said reference position in a direction in which an axis of rotation passing through said rotation center is a roll-off value, wherein said roll-off value being negative means said selected position on said first main surface is deviated in a direction towards said second main surface of said information recording medium glass substrate,
   said roll-off value at a first radial position where said distance in the radial direction from said outer peripheral end surface is 0.55 mm is a first roll-off value,
   said roll-off value at a second radial position where said distance in the radial direction from said outer peripheral end surface is 0.45 mm is a second roll-off value,
   said roll-off value at a third radial position where said distance in the radial direction from said outer peripheral end surface is 0.30 mm is a third roll-off value,
   a difference between said first roll-off value and said second roll-off value is a first roll-off variation, and
   a difference between said second roll-off value and said third roll-off value is a second roll-off variation,
   said first roll-off variation and said second roll-off variation satisfy the following conditions 1 and 2:

$250 \text{ Å} \leq \text{first roll-off variation} \leq 450 \text{ Å}$   condition 1

$950 \text{ Å} \leq \text{second roll-off variation} \leq 1870 \text{ Å}$   condition 2, and said first roll-off value satisfies the following condition:

$-220 \text{ Å} \leq \text{first roll-off value} \leq -120 \text{ Å}$.

2. The information recording medium glass substrate according to claim 1, wherein said information recording medium glass substrate has an inclined surface having a width of 0.1 mm in the radial direction from said outer peripheral end surface, in a region in which said first main surface and said outer peripheral end surface intersect.

3. The information recording medium glass substrate according to claim 1, wherein said distance in the radial direction from said outer peripheral end surface to said axis of rotation is 32.5 mm.

4. The information recording medium glass substrate according to claim 1, wherein said third roll-off value satisfies the following condition:

$-2540 \text{ Å} \leq \text{third roll-off value} \leq -1320 \text{ Å}$.

5. An information recording medium for use in an information storage device, comprising:
   a disk-shaped information recording medium glass substrate having a rotation center; and
   a magnetic thin film layer provided on a first main surface of said information recording medium glass substrate,
   said information recording medium glass substrate comprising:
   said first main surface having said magnetic thin film layer formed thereon;
   a second main surface opposite said first main surface; and
   an outer peripheral end surface located at an edge of said information recording medium glass substrate, wherein
   in a distance in a radial direction from said outer peripheral end surface of said first main surface toward said rotation center, when
   an extension of a line between a point where said distance in the radial direction from said outer peripheral end surface on said first main surface is 1.2 mm and a point where said distance in the radial direction from said outer peripheral end surface is 0.75 mm is a reference position, and an amount of deviation of any selected position on said first main surface from said reference position in a direction in which an axis of rotation passing through said rotation center is a roll-off value, wherein said roll-off value being negative means said selected position on said first main surface is deviated in a direction towards said second main surface of said information recording medium glass substrate,
   said roll-off value at a first radial position where said distance in the radial direction from said outer peripheral end surface is 0.55 mm is a first roll-off value,
   said roll-off value at a second radial position where said distance in the radial direction from said outer peripheral end surface is 0.45 mm is a second roll-off value,
   said roll-off value at a third radial position where said distance in the radial direction from said outer peripheral end surface is 0.30 mm is a third roll-off value,
   a difference between said first roll-off value and said second roll-off value is a first roll-off variation, and
   a difference between said second roll-off value and said third roll-off value is a second roll-off variation,
   said first roll-off variation and said second roll-off variation satisfy the following conditions 1 and 2:

$250 \text{ Å} \leq \text{first roll-off variation} \leq 450 \text{ Å}$   condition 1

$950 \text{ Å} \leq \text{second roll-off variation} \leq 1870 \text{ Å}$   condition 2, and said first roll-off value satisfies the following condition:

$-220 \text{ Å} \leq \text{first roll-off value} \leq -120 \text{ Å}$.

6. The information recording medium according to claim 5, wherein a recording density on a single side of said first main surface is 500 Gbit/inch$^2$ or more.

7. The information recording medium according to claim 5, wherein said third roll-off value satisfies the following condition:

$-2540 \text{ Å} \leq \text{third roll-off value} \leq -1320 \text{ Å}$.

* * * * *